United States Patent
Sun et al.

(10) Patent No.: US 10,107,666 B2
(45) Date of Patent: Oct. 23, 2018

(54) WATER LEVEL MONITORING METHOD

(71) Applicant: Shanghai Kohler Electronics, Ltd., Shanghai (CN)

(72) Inventors: Haixing Sun, Shanghai (CN); Wei Liu, Shanghai (CN); Jiongjun Xue, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 8 days.

(21) Appl. No.: 15/380,537

(22) Filed: Dec. 15, 2016

(65) Prior Publication Data
US 2017/0176234 A1    Jun. 22, 2017

(30) Foreign Application Priority Data
Dec. 17, 2015  (CN) .......................... 2015 1 0954794

(51) Int. Cl.
G01F 23/24    (2006.01)
G01F 23/26    (2006.01)

(52) U.S. Cl.
CPC ............ *G01F 23/24* (2013.01); *G01F 23/265* (2013.01)

(58) Field of Classification Search
CPC ...... G01N 17/00; G01N 17/006; G01N 17/02; G01N 27/048; G01F 23/24; G01F 23/241
USPC ........................................ 324/693, 694, 696
See application file for complete search history.

(56) References Cited

U.S. PATENT DOCUMENTS

| | | | |
|---|---|---|---|
| 4,723,122 A * | 2/1988 | Maltby | G08C 19/02 324/601 |
| 6,078,280 A | 6/2000 | Perdue et al. | |
| 7,360,418 B2 * | 4/2008 | Pelovitz | A47J 31/4457 73/304 C |
| 2002/0088824 A1 * | 7/2002 | Newman | B67D 1/0028 222/63 |
| 2008/0288776 A1 * | 11/2008 | Kim | H04L 9/0822 713/168 |

(Continued)

FOREIGN PATENT DOCUMENTS

GB    2 218 214    11/1989

OTHER PUBLICATIONS

EPO App. No. 16204621 cf Form 1507 (May 10, 2017).*
Extended European Search Report issued in corresponding application No. 16204621 dated May 10, 2017.

*Primary Examiner* — Tung X Nguyen
*Assistant Examiner* — Robert P Alejnikov, Jr.
(74) *Attorney, Agent, or Firm* — Foley & Lardner LLP (57) ABSTRACT

A method for detecting water level in a water tank that includes a probe voltage value acquiring step comprising periodically acquiring a voltage value of a water level probe as a probe voltage value; a voltage value comparing step that compares the probe voltage value with a stored voltage threshold value, if the probe voltage value is lower than the voltage threshold value, the method determines that the water tank level is higher than the water level probe and updates the water data to be the probe voltage value, and if the probe voltage value is higher than the voltage threshold value, the method determines that the water tank level is lower than the water level probe and updates the waterless data to be the probe voltage value; and a threshold value updating step that updates the voltage threshold value in response to the water data and the waterless data.

11 Claims, 5 Drawing Sheets

(56) References Cited

U.S. PATENT DOCUMENTS

| | | | |
|---|---|---|---|
| 2010/0070209 A1* | 3/2010 | Sai | G01F 23/284 |
| | | | 702/55 |
| 2010/0193182 A1* | 8/2010 | Levy | E21B 47/042 |
| | | | 166/250.01 |
| 2012/0291541 A1* | 11/2012 | Liu | G01F 23/26 |
| | | | 73/304 C |

* cited by examiner

WATER LEVEL MONITORING METHOD

CROSS-REFERENCE TO RELATED PATENT APPLICATIONS

This application claims the benefit of and priority to Chinese Patent Application No. 201510954794.X, filed Dec. 17, 2015, which is incorporated by reference herein in its entirety, including the specification, drawings, claims, and abstract.

BACKGROUND

The present application relates to the field of water tank-related technologies. More specifically, this application relates to a method and a system for detecting water tank level.

SUMMARY

There is a necessity to provide a method and a system for detecting water tank level to address the situation where prior systems make incorrect determination of water level in case of contaminates, such as algae contamination.

The present application discloses methods and systems for detecting water tank level. One such system/method includes periodically acquiring a voltage value of a water level probe as probe voltage value; comparing the probe voltage value with a stored voltage threshold value, if the probe voltage value is lower than the voltage threshold value, determining that the water tank level is higher than the water level probe and updating the water data to be the probe voltage value, if the probe voltage value is higher than the voltage threshold value, determining that the water tank level is lower than the water level probe and updating the waterless data to be the probe voltage value; updating the voltage threshold value according to the water data and the waterless data. The system/method that dynamically adjusts the voltage threshold value, according to the present application, can perform excellent water level detection in case of algae contamination and avoid errors.

Another such method for detecting water tank level includes a probe voltage value acquiring step that periodically acquires a voltage value of a water level probe as probe voltage value. The method may include a voltage value comparing step that compares the probe voltage value with a stored voltage threshold value. If the probe voltage value is lower than the voltage threshold value, the method determines that the water tank level is higher than the water level probe and updates the water data to be the probe voltage value. If the probe voltage value is higher than the voltage threshold value, the method determines that the water tank level is lower than the water level probe and updates the waterless data to be the probe voltage value.

The system/method may include a threshold value updating step that includes updating the voltage threshold value according to the water data and the waterless data.

Another such system for detecting water tank level includes a probe voltage value acquiring module, a voltage value comparing module, and a threshold value updating module. The probe voltage value acquiring module is configured to periodically acquire a voltage value of a water level probe as a probe voltage value. The voltage value comparing module is configured to compare the probe voltage value with a stored voltage threshold value. If the probe voltage value is lower than the voltage threshold value, the system determines that the water tank level is higher than the water level probe and updates the water data to be the probe voltage value. If the probe voltage value is higher than the voltage threshold value, the system determines that the water tank level is lower than the water level probe and updates the waterless data to be the probe voltage value. The threshold value updating module is configured to update the voltage threshold value according (e.g., in response) to the water data and the waterless data.

Another such method for detecting water tank level includes setting a voltage threshold value to be a threshold initial value, setting a water data to be a water data initial value, and setting a waterless data to be a waterless data initial value. The method also includes acquiring a voltage value from a water level probe as a probe voltage value and comparing the probe voltage value with the voltage threshold value. The water data is updated to be the probe voltage value if the probe voltage value is less than or equal to the voltage threshold value, which indicates that the water tank level is higher than or equal to the water level probe. The waterless data is updated to be the probe voltage value if the probe voltage value is greater than the voltage threshold value, which indicates that the water tank level is less than the water level probe. The method also includes updating the voltage threshold value in response to at least one of the water data and the waterless data.

Updating the threshold value may include updating the voltage threshold value to be an average of the water data and the waterless data.

The method may include resetting at least one of the voltage threshold value to the threshold initial value, the water data to the water data initial value, or the waterless data to the waterless data initial value in response to a reset request. In at least one embodiment, the voltage threshold value is reset to the threshold initial value, the water data is reset to the water data initial value, and the waterless data is reset to the waterless data initial value in response to the reset request.

The method may include storing the water data, the waterless data, and the voltage threshold value in a memory chip that does not lose data after a power failure.

Updating the threshold value may include updating the voltage threshold value to be an average of the water data and the waterless data.

Upon comparing the probe voltage value with the stored voltage threshold value, the system may include a module that executes a water logic regarding the water level probe and updates the water data to be the probe voltage value if the probe voltage value is less than or equal to the voltage threshold value. The module may execute a waterless logic regarding the water level probe and updates the waterless data to be the probe voltage value if the probe voltage value is higher than the voltage threshold value.

The method may use the water logic and the waterless logic to operate a water inlet solenoid valve that controls a water inlet of the water tank.

The systems/methods may be configured to dynamically adjusts a voltage threshold value by periodically acquiring the difference between a probe voltage value and the voltage threshold value. Algae have the growth characteristic that they grow gradually and only connect together in the end. Their conductivity increases slowly and gradually, such that the output voltage value of a water level probe decreases slowly. Therefore, the method that dynamically adjusts the voltage threshold value according to the present application can perform excellent water level detection in case of algae contamination and avoid errors.

DETAILED DESCRIPTION

The application will be further described in detail below with reference to the accompanying drawings and the specific embodiments.

Figure 1:
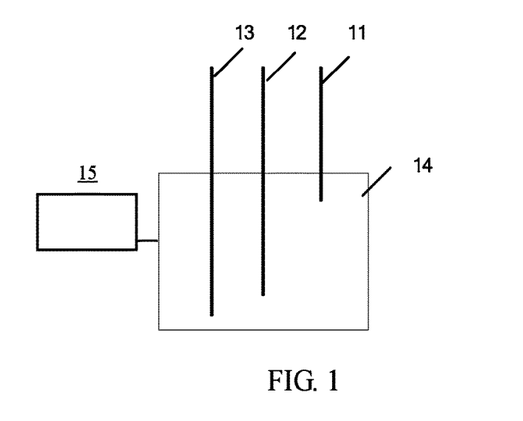
FIG. 1 is a schematic diagram of the structure of a water tank and probes according to an embodiment.

FIG. 1 illustrates a water tank 14 (e.g., a small water tank) having a high water level probe 11, a low water level probe 12 and a common probe 13 that are configured to detect the position of the current water level within the water tank 14. A water inlet solenoid valve 15 can be controlled in response to the position of the current water level, as shown in FIG. 1. For example, the water inlet solenoid valve 15 can be configured to add water to the water tank 14 in a first position, and in a second position of the water inlet solenoid valve 15, no water is added to the water tank 14.

Figure 2A:
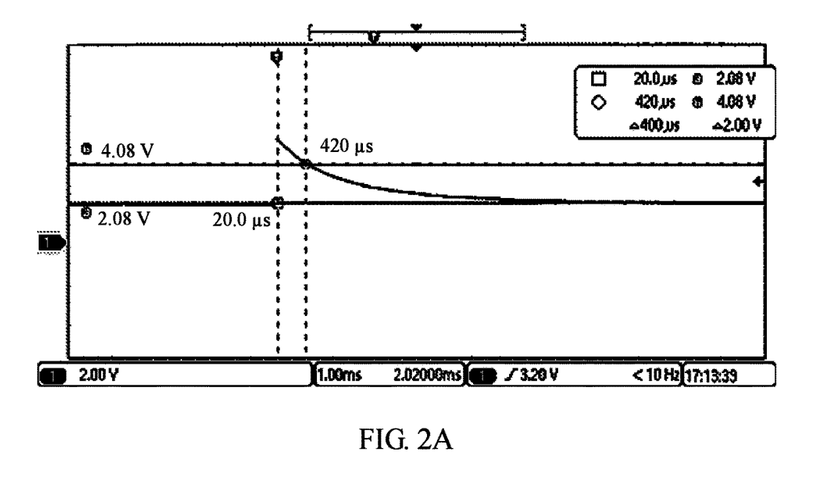
FIG. 2A is a schematic diagram of output voltage when the water level probe is in a water state in at least one example.
Figure 2B:
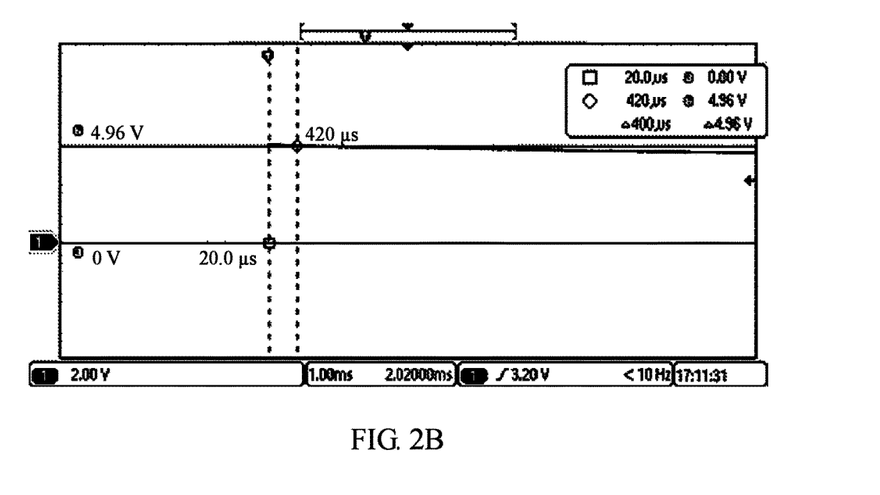
FIG. 2B is a schematic diagram of output voltage when the water level probe is in a waterless state in at least one example.

When a water level probe and a common probe are in communication via water, the water level probe is in a water state, and the water level probe outputs a relatively low voltage, such as shown in FIG. 2A. By way of example, the output voltage ΔV=2V. Conversely, when they are not in communication via water, the water level probe is in a waterless state, and the water level probe outputs a relatively high voltage (compared to the water state), such as shown in FIG. 2B. By way of example, the output voltage ΔV=4.96V. Furthermore, according to the level state, the position of the current level (e.g., the current water level) is acquired.

As a result, it is relatively easy to determine the level state that a water level probe is in if a reasonable voltage threshold value is set. For example, when the system detects that the output voltage of the probe is lower than the voltage threshold value, the system determines that the probe is in a water state (i.e., the probe is in water). On the contrary, when the system detects that the output voltage of the probe is relatively high (e.g., compared to the voltage threshold value and/or the voltage in the water state), the system determines that the probe is in a waterless state (i.e., the probe is not in water). This, for example, is a working principle for a water level detection system of a water tank.

When a water tank is not contaminated, there are only two conductive media between a water level probe and a common probe: water and the air. Air has relatively poor conductivity and, as a result, the voltage value outputted by the water level probe is relatively high. Water has different conductivities due to different water qualities. That is the conductivity of water is influenced by the water quality. When water becomes purer, the conductivity becomes poorer (e.g., as purity increases, conductivity decreases), and a higher voltage value is outputted, which is however definitively much lower than the voltage value outputted in the case of air. By setting a reasonable voltage threshold value that is between the value for air and the value for pure water (Total dissolved solids or TDS=0), software is able to differentiate various situations with water or without water. As the voltage value outputted in the case of the air is around 4.9 V and the voltage value outputted in the case of pure water (TDS=0) is around 2 V, as shown in FIG. 2A and FIG. 2B, the voltage threshold value is fixed at 3 V.

Figure 3A:
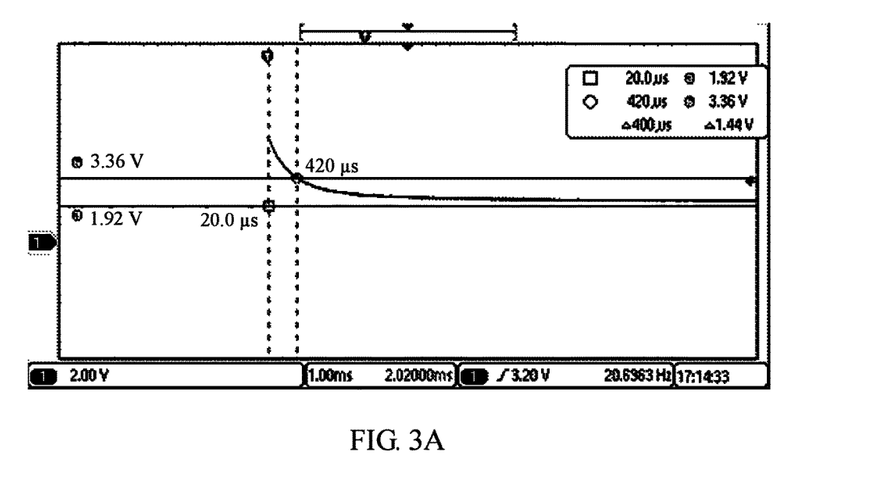
FIG. 3A is a schematic diagram of output voltage when the water level probe is in a contaminated and waterless state in at least one example.
Figure 3B:
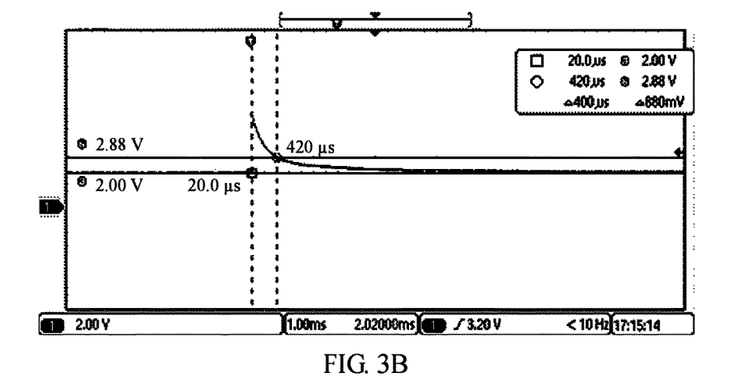
FIG. 3B is a schematic diagram of output voltage when the water level probe is in a contaminated and water state in at least one example.

When a water tank is contaminated, such as by algae, experiments have shown that, when a water level probe and a common probe are in communication not via water but via algae, the water level probe is in a state with contamination and without water, and the output voltage value of the water level probe is between 1 V and 4.9 V. By way of example, this state is shown in FIG. 3A having the output voltage value ΔV=1.44 V. When a water level probe and a common probe are in communication simultaneously via water and algae, the water level probe is in a state with contamination and water, and the output voltage value of the water level probe is even lower than the voltage value for communication only via water, as shown in FIG. 3B where the output voltage value ΔV=880 mV.

In the waterless state, therefore, the output voltage value is lower than 3 V due to the presence of the algae. If the voltage threshold value is still 3 V, the waterless state would be mistakenly determined to be a water state, and the incorrect determination of water tank level will cause incorrect actions of a water inlet solenoid valve.

Figure 4:
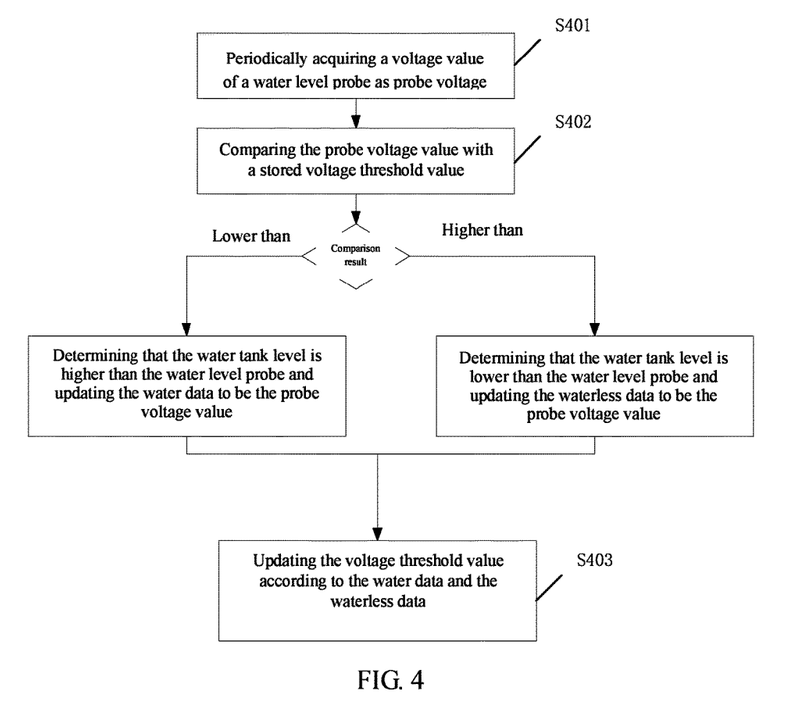
FIG. 4 is a flow chart of a method for detecting water tank level, according to at least one embodiment of this application.

FIG. 4 shows a method for detecting water tank level according to at least one embodiment of this application. Although the method is described using the term step (or steps), it should be noted that the steps may be performed in varying orders.

As shown in FIG. 4, step S401 includes periodically acquiring a voltage value of a water level probe as a probe voltage value.

Also shown, step S402 includes comparing the probe voltage value with a stored voltage threshold value, such that if the probe voltage value is lower than (or lower than and equal to) the voltage threshold value, a determination that the level of water in the water tank is higher than the water level probe is made by the system and the water data is updated to be the probe voltage value, and if the probe voltage value is higher than the voltage threshold value, a determination that the level of water in the water tank is lower than the water level probe is made and the waterless data is updated to be the probe voltage value.

Also shown, step S403 includes updating the voltage threshold value according to (e.g., in response to, based on, etc.) the water data and the waterless data.

Algae have the growth characteristic that they grow gradually and only connect together in the end. Algae's conductivity increases slowly and gradually, such that the output voltage value of a water level probe decreases slowly. As such, step S401 may be configured to periodically acquire a voltage value of a water level probe, then in step S402, a voltage threshold value is used first to determine the water level, such that a corresponding logic (e.g., controlling water into a water tank) can be executed according to the determined relationship between the water tank level and the water level probe. At the same time, when the water level is determined, the water data and the waterless data can be updated, respectively. For example, in step S403, the voltage threshold value is updated according to the water data and the waterless data, such that the voltage threshold value can be dynamically adjusted according to the water data and the waterless data and/or adapted to the slow change to the output voltage value of the water level probe caused by the algae growth. A system employing the method shown in FIG. 4 can perform excellent water level detection in case of algae contamination and avoid errors attributable to, for example, the presence of algae.

In at least one embodiment, the step S403 includes updating the voltage threshold value to be an average of the water data and the waterless data. A method/system may update the voltage threshold value to be an average of the water data and the waterless data so that the voltage threshold value can clearly differentiate situations with water and without water.

The system/method (e.g., at the step S403) may include an initial value setting step and/or a reset responding step. The initial value setting step may include setting the voltage threshold value to be the threshold initial value, setting the water data to be the water data initial value, and setting the waterless data to be the waterless data initial value. The reset responding step may include executing the initial value setting step in response to a reset request. An initial value setting step and a reset responding step may be added to any embodiment, and the initial value setting step can be carried out when the system is started. A reset request can be triggered, for example, when a user presses a reset button on the water tank. The reset responding step can be configured to initiate the initial value setting step. For example, when a user cleans up algae in the water tank, the user may reset all initial values by pressing the reset button.

In at least one embodiment, the water data, the waterless data and the voltage threshold value are stored in a memory chip that does not lose data after a loss of power (e.g., a power failure). Flash (e.g., flash memory) is one non-limiting example of a memory chip that does not lose data after a power failure. However, other types of memory chips may be employed. The system/method may be configured so that every time when the washing is completed, the current voltage threshold value is saved into the memory chip (e.g., the flash), such that the data can be saved even in the event of a power failure. When the water tank is powered on again after a power failure, the system/method first reads the voltage threshold value saved before the power failure from the flash as the basis for the first time determination of water level. This system/method advantageously avoids an incorrect determination of water level following a loss of power, such as after a power failure.

In at least one embodiment, the step S402 includes comparing the probe voltage value with a stored voltage threshold value. If the probe voltage value is lower than the voltage threshold value, the system/method determines that the water tank level is higher than the water level probe, executes a water logic regarding the water level probe, and updates the water data to be the probe voltage value. If the probe voltage value is higher than the voltage threshold value, the system/method determines that the water tank level is lower than the water level probe, executes a waterless logic regarding the water level probe, and updates the waterless data to be the probe voltage value. The water logic and the waterless logic may be used to operate a water inlet solenoid valve that controls a water inlet of the water tank.

The system/method includes one or more water level probes. In at least one embodiment, the system/method includes a low water level probe and a high water level probe arranged inside a water tank, and the height of the low water level probe in the water tank is lower than the height of the high water level probe in the water tank. In at least one embodiment, the low water level probe is configured to provide a first voltage upon a determination that the water tank level is lower than the low water level probe, and the high water level probe is configured to provide a second voltage upon a determination that the water tank level is at least as high as the high water level probe.

In at least one embodiment, executing a water logic regarding the water level probe includes taking no action if the probe is a low water level probe (e.g., in response to the low water level probe detecting water), and/or shutting down the water inlet solenoid valve if the probe is a high water level probe (e.g., in response to the high water level probe detecting water).

In at least one embodiment, executing a waterless logic regarding the water level probe includes opening up the water inlet solenoid valve if the probe is a low water level probe, and taking no action if the probe is a high water level probe.

Figure 5:
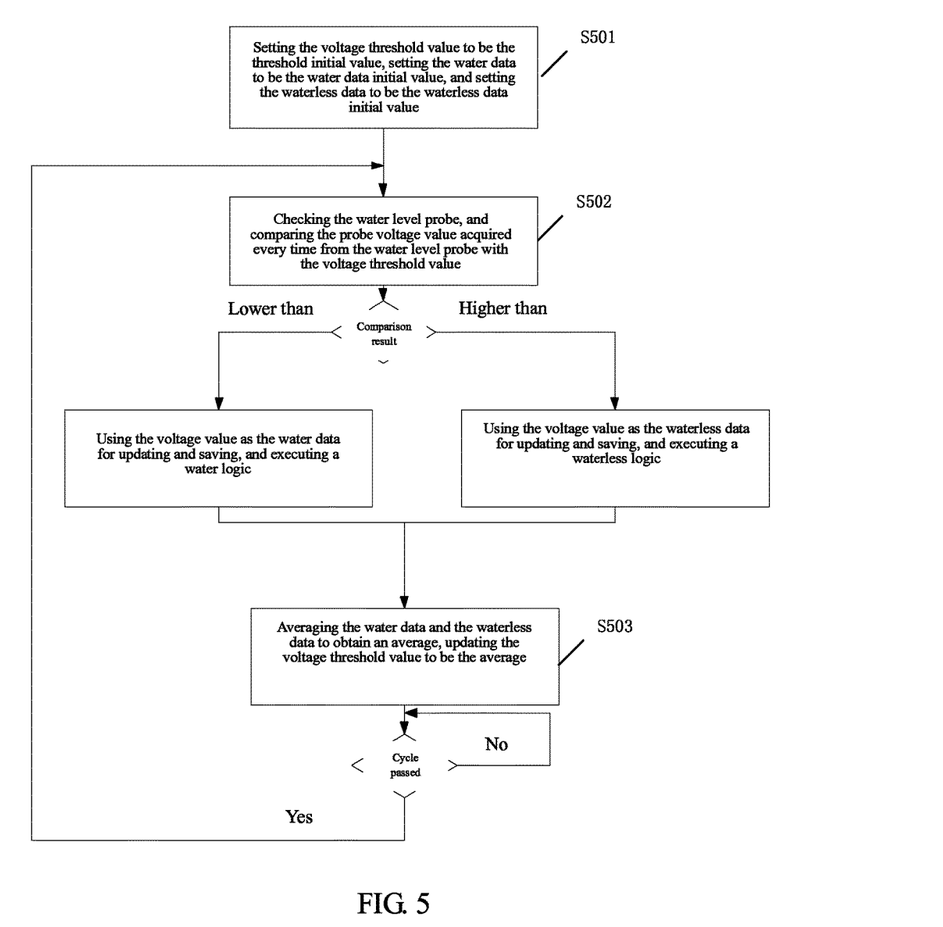
FIG. 5 is a flow chart of at least one embodiment of this application.

FIG. 5 is a flow chart of an exemplary embodiment of a method for use by a system, according to the present application. As shown, the method includes step S501, which includes setting the voltage threshold value to be the threshold initial value, setting the water data to be the water data initial value, and setting the waterless data to be the waterless data initial value. For example, the threshold initial value may be set to about 3 V, the water data initial value may be set to about 1 V, and the waterless data initial value may be set to about 5 V.

Also shown in FIG. 5, step S502 includes checking the water level probe, and comparing the probe voltage value acquired every time from the water level probe with the voltage threshold value. If the probe voltage value is lower than the voltage threshold value, the system/method uses the voltage value as the water data for updating and saving, and executes a water logic. If the probe voltage value is higher than the voltage threshold value, the system/method uses the voltage value as the waterless data for updating and saving, and executes a waterless logic.

Also shown in FIG. 5, step S503 includes averaging the water data and the waterless data to obtain an average, as well as updating the voltage threshold value to be the average. The system/method may execute another step or determination after a cycle of fixed time. By way of example, step S502 may be executed.

Figure 6:
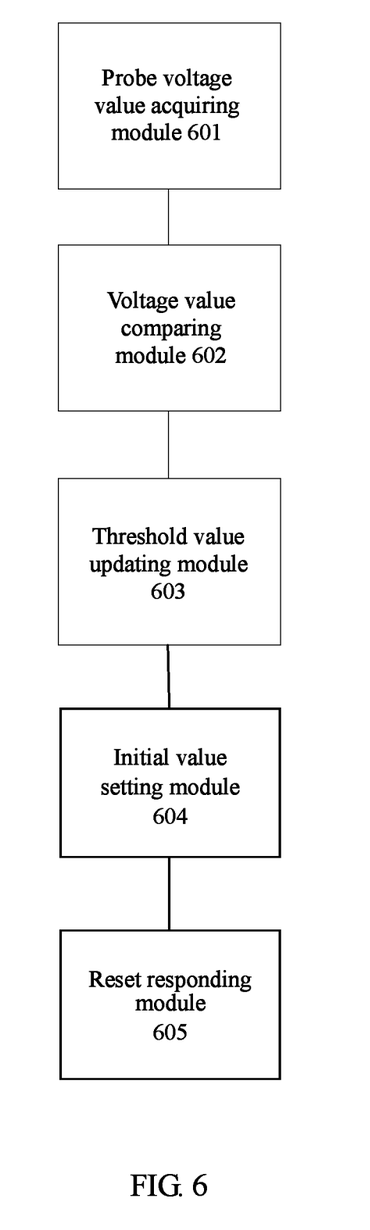
FIG. 6 is a structural module diagram of a system for detecting water tank level according to at least one embodiment of this application.

FIG. 6 is a structural module diagram (e.g., a schematic) of a system for detecting water tank level according to the present invention. As shown, the system includes a probe voltage value acquiring module 601, a voltage value comparing module 602, and a threshold value updating module 603.

The probe voltage value acquiring module 601 is configured to periodically acquire a voltage value of a water level probe as a probe voltage value.

The voltage value comparing module 602 is configured to compare the probe voltage value with a stored voltage threshold value. If the probe voltage value is lower than the voltage threshold value, the system/method determines that the water tank level is higher than the water level probe and updates the water data to be the probe voltage value. If the probe voltage value is higher than the voltage threshold value, the system/method determines that the water tank level is lower than the water level probe and updates the waterless data to be the probe voltage value.

The threshold value updating module 603 is configured to update the voltage threshold value according to the water data and the waterless data. In at least one embodiment, the threshold value updating module is specifically configured to update the voltage threshold value to be an average of the water data and the waterless data.

In at least one embodiment, the system further includes an initial value setting module 604 and/or a reset responding module 605.

The initial value setting step module 604 is configured to set the voltage threshold value to be the threshold initial value, set the water data to be the water data initial value, and set the waterless data to be the waterless data initial value.

The reset responding module 605 is configured to execute the initial value setting module in response to a reset request. For example, a user may initiate a reset request.

In at least one embodiment, the water data, the waterless data, and/or the voltage threshold value are stored in a memory chip that does not lose data after a power failure.

In at least one embodiment, the voltage value comparing module 602 is configured to compare the probe voltage value with a stored voltage threshold value. If the probe voltage value is lower than the voltage threshold value, the system/method determines that the water tank level is higher than the water level probe, executes a water logic regarding the water level probe, and updates the water data to be the probe voltage value. If the probe voltage value is higher than the voltage threshold value, the system/method determines that the water tank level is lower than the water level probe, executes a waterless logic regarding the water level probe, and updates the waterless data to be the probe voltage value. The water logic and the waterless logic can be used by the system/method to operate a water inlet solenoid valve that controls a water inlet of the water tank.

The above embodiments only show several ways to implement the present invention, the description is relatively specific and detailed, which, however, cannot be construed to be a limitation to the scope of the present invention. It should be noted that, to those skilled in the art, a number of variations and improvements may be made without departing from the concept of the present invention, all of which shall be encompassed by the scope of the present invention. Therefore, the scope of the present invention shall be subjected to the appended claims.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the methods and systems for detecting water tank level, as shown in the exemplary embodiments, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., steps, modules, probes, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A method for detecting a water level in a water tank, comprising:

a probe voltage value acquiring step comprising periodically acquiring a voltage value of a water level probe as a probe voltage value;

a voltage value comparing step comprising comparing the probe voltage value with a stored voltage threshold value, wherein if the probe voltage value is lower than the voltage threshold value, the water tank level is determined to be higher than the water level probe and updates water data to be the probe voltage value, and if the probe voltage value is higher than the voltage threshold value, the water tank level is determined to be lower than the water level probe and updates waterless data to be the probe voltage value;

a threshold value updating step comprising updating the voltage threshold value in response to the water data and the waterless data; and storing the water data, the waterless data, and the voltage threshold value in a memory chip that does not lose data after a power failure;

wherein upon comparing the probe voltage value with the stored voltage threshold value:

if the probe voltage value is lower than the voltage threshold value, the water tank level is determined to be higher than the water level probe, executes a water logic regarding the water level probe, and updates the water data to be the probe voltage value; and if the probe voltage value is higher than the voltage threshold value, the water tank level is determined to be lower than the water level probe, executes a waterless logic regarding the water level probe, and updates the waterless data to be the probe voltage value;

wherein the water logic and the waterless logic are used to operate a water inlet solenoid valve that controls a water inlet of the water tank; and wherein in response to the water tank being powered on after the power failure, the voltage threshold value saved before the power failure is read from the memory chip as the basis for a first determination of water level.

2. The method of claim 1, wherein the threshold value updating step comprises updating the voltage threshold value to be an average of the water data and the waterless data.

3. The method of claim 1, further comprising:

an initial value setting step comprising setting the voltage threshold value to be the threshold initial value, setting the water data to be the water data initial value, and setting the waterless data to be the waterless data initial value; and a reset responding step comprising executing the initial value setting step in response to a reset request.

4. A system for detecting a water tank level, comprising:

a probe voltage value acquiring module that periodically acquires a voltage value of a water level probe as a probe voltage value;

a voltage value comparing module that compares the probe voltage value with a stored voltage threshold value, wherein if the probe voltage value is lower than the stored voltage threshold value, the voltage value comparing module determines that the water tank level is higher than the water level probe and updates the water data to be the probe voltage value, and wherein if the probe voltage value is higher than the stored voltage threshold value, the voltage value comparing module determines that the water tank level is lower than the water level probe and updates the waterless data to be the probe voltage value;

a water inlet solenoid valve that controls a water inlet of the water tank; and a threshold value updating module that updates the stored voltage threshold value in response to the water data and the waterless data;

wherein the water data, the waterless data, and the voltage threshold value are stored in a memory chip that does not lose data after a power failure;

wherein the voltage value comparing module:

executes a water logic regarding the water level probe and updates the water data to be the probe voltage value upon a determination that the water tank level is higher than the water level probe; and executes a waterless logic regarding the water level probe, and update the waterless data to be the probe voltage value upon a determination that the water tank level is lower than the water level probe; and wherein the water logic and the waterless logic are used to operate the water inlet solenoid valve to control the water inlet of the water tank; and wherein the voltage threshold value saved before the power failure is read from the memory chip as the basis for a first time determination of water level in response to the water tank being powered on after the power failure.

5. The system of claim 4, wherein the threshold value updating module updates the voltage threshold value to be an average of the water data and the waterless data.

6. The system of claim 4, further comprising:

an initial value setting module that sets the stored voltage threshold value to be the threshold initial value, sets the water data to be the water data initial value, and sets the waterless data to be the waterless data initial value; and a reset responding module that executes the initial value setting module in response to a reset request.

7. A method for detecting a water level in a water tank, comprising:

setting a voltage threshold value to be a threshold initial value, a water data to be a water data initial value, and a waterless data to be a waterless data initial value;

acquiring a voltage value from a water level probe as a probe voltage value; comparing the probe voltage value with the voltage threshold value, wherein:

the water data is updated to be the probe voltage value if the probe voltage value is less than or equal to the voltage threshold value, which indicates that the water tank level is higher than or equal to the water level probe; and the waterless data is updated to be the probe voltage value if the probe voltage value is greater than the voltage threshold value, which indicates that the water tank level is less than the water level probe; and updating the voltage threshold value in response to at least one of the water data and the waterless data;

wherein the water data, the waterless data, and the voltage threshold value are stored in a memory chip that does not lose data after a power failure, wherein upon comparing the probe voltage value with the stored voltage threshold value:

a module executes a water logic regarding the water level probe and updates the water data to be the probe voltage value if the probe voltage value is less than or equal to the voltage threshold value; and the module executes a waterless logic regarding the water level probe and updates the waterless data to be the probe voltage value if the probe voltage value is higher than the voltage threshold value; and wherein the water logic and the waterless logic are used to operate a water inlet solenoid valve that controls a water inlet of the water tank; and wherein the voltage threshold value saved before the power failure is read from the memory chip as the basis for a first time determination of water level in response to the water tank being powered on after the power failure.

8. The method of claim 7, wherein updating the threshold value comprises updating the voltage threshold value to be an average of the water data and the waterless data.

9. The method of claim 7, further comprising resetting at least one of the voltage threshold value to the threshold initial value, the water data to the water data initial value, or the waterless data to the waterless data initial value in response to a reset request.

10. The method of claim 9, wherein the voltage threshold value is reset to the threshold initial value, the water data is reset to the water data initial value, and the waterless data is reset to the waterless data initial value in response to the reset request.

11. The method of claim 7, wherein updating the threshold value comprises updating the voltage threshold value to be an average of the water data and the waterless data.

* * * * *